US008454048B1

(12) United States Patent
Regan et al.

(10) Patent No.: US 8,454,048 B1
(45) Date of Patent: Jun. 4, 2013

(54) FOLDING WHEELCHAIR MECHANISM

(75) Inventors: Reese M. Regan, Simi Valley, CA (US); Gary S. Werschmidt, Santa Fe Springs, CA (US)

(73) Assignee: Columbia Medical Manufacturing, LLC, Santa Fe Springs, CA (US)

(*) Notice: Subject to any disclaimer, the term of this patent is extended or adjusted under 35 U.S.C. 154(b) by 0 days.

(21) Appl. No.: 13/361,818

(22) Filed: Jan. 30, 2012

(51) Int. Cl.
*A63C 1/00* (2006.01)
*B62B 1/00* (2006.01)

(52) U.S. Cl.
USPC ............................ 280/649; 280/647; 280/646

(58) Field of Classification Search
USPC ............... 280/250.1, 650, 39, 42, 304.1, 652, 280/646-647; 297/44, 42
See application file for complete search history.

(56) References Cited

U.S. PATENT DOCUMENTS 4,042,250 A * 8/1977 Rodaway ........................ 280/42
4,045,051 A 8/1977 Igarashi et al.
4,077,640 A * 3/1978 Perego ............................ 280/42
4,140,341 A 2/1979 Rabe
4,232,897 A * 11/1980 Maclaren et al. ............... 297/45
4,245,849 A 1/1981 Thiboutot
4,273,350 A * 6/1981 Williams ................... 280/250.1
4,322,093 A * 3/1982 Otto .............................. 280/650
4,324,410 A * 4/1982 Perego ............................ 280/42
4,386,672 A * 6/1983 Coker ............................. 180/13
4,736,960 A * 4/1988 Batty et al. ....................... 280/42
4,863,181 A * 9/1989 Howle ....................... 280/250.1
5,016,720 A * 5/1991 Coker ............................. 180/13
5,076,390 A * 12/1991 Haskins ..................... 280/250.1
5,154,438 A 10/1992 Barclay
5,188,383 A * 2/1993 Thompson ................. 280/250.1
5,288,098 A * 2/1994 Shamie ......................... 280/642
5,301,970 A * 4/1994 Haskins ..................... 280/250.1
5,496,050 A 3/1996 Geiger et al.
5,782,483 A * 7/1998 Rogers et al. ................. 280/642
6,050,582 A 4/2000 Horacek
6,135,475 A 10/2000 Brown et al.
6,302,429 B1 10/2001 Friedrich
6,572,133 B1 * 6/2003 Stevens ......................... 280/642
6,811,178 B2 * 11/2004 Tomasi et al. ................ 280/650
6,839,918 B1 1/2005 Jensen
6,877,762 B2 * 4/2005 Yamazaki ..................... 280/647
7,731,220 B2 * 6/2010 Chen et al. .................... 280/639
7,854,481 B2 * 12/2010 Fraser ........................ 297/440.2

* cited by examiner

*Primary Examiner* — John Walters
*Assistant Examiner* — James Triggs
(74) *Attorney, Agent, or Firm* — Paul M. Thompson; Cochran Freund & Young LLC

(57) ABSTRACT

Disclosed is a method and device for varying the width of a wheelchair. The disclosed embodiments utilize a plurality of vertical pivots and linkages to facilitate the manipulation of a pair of horizontally oriented "scissor" linkages in order to reduce the track of the wheels for use in close quarter environments, such as commercial airlines, or to collapse the chair for transport or storage.

15 Claims, 5 Drawing Sheets

FOLDING WHEELCHAIR MECHANISM

BACKGROUND OF THE INVENTION

It is common for manual wheelchairs to be designed to fold or collapse in order to be stored or transported when not in use by the physically impaired. Traditionally, these single passenger devices are vehicles with a flexible seat suspended by a frame structure, which is mobilized by a set of larger opposing rear drive wheels and a pair of front steering wheels or casters. Typical folding mechanisms usually involve simple vertical cross braces that connect the upper part of one side frame to the lower part of the opposing side frame. These type of mechanisms often trade height for width because the length of the cross braces is inflexible. Designs with flexible length cross braces are typically complex or frail due to the nature of the length adjustment, which is usually accomplished by telescoping the cross brace members. Conventional folding wheelchairs that utilize vertical scissor mechanisms are not usable unless they are deployed in a fully open configuration.

SUMMARY OF THE INVENTION

An embodiment of the present invention may therefore comprise: an apparatus that supports and adjusts the width of a wheelchair comprising: a first side frame assembly that rigidly affixes the position and orientation of a right rear wheel and a right front wheel of the wheelchair; a second side frame assembly that rigidly affixes the position and orientation of a left rear wheel and a left front wheel of the wheelchair; a right scissor linkage pivot secured to a rearward portion of the first side frame assembly and left scissor linkage pivot secured to a rearward portion of the second side frame assembly; a first scissor linkage pivotally secured between the right scissor linkage pivot on one end, and pivotally secured with a forward pivot to a left pivot linkage on an opposing end of the first scissor linkage, wherein the axis of the right scissor linkage pivot and the axis of the left forward pivot are approximately parallel, thereby facilitating coplanar rotation of the first scissor linkage and the left pivot linkage, the right scissor linkage pivot that is affixed to a rearward portion of the first side frame assembly and the left forward pivot that is pivotally secured to a forward portion of the first side frame assembly; a second scissor linkage pivotally secured between the left scissor linkage pivot on one end, and pivotally secured with a forward pivot to a right pivot linkage on an opposing end of the second scissor linkage, wherein the axis of the left scissor linkage pivot and the axis of the right forward pivot are approximately parallel, thereby facilitating coplanar rotation of the second scissor linkage and the right pivot linkage, the left scissor linkage pivot that is affixed to a rearward portion of the second side frame assembly and the right forward pivot that is pivotally secured to a forward portion of the second side frame assembly; a central pivot that pivotally secures the first scissor linkage the second scissor linkage approximately midway between, and parallel to, the pivot axis of the scissor linkage pivots and the forward pivots of each scissor linkage; a left release cross member pivotally secured at a lateral end to the first scissor linkage between, and parallel to, the pivot axis of the central pivot and the left forward pivot; a right release cross member pivotally secured at a lateral end to the second scissor linkage between, and parallel to, the pivot axis of the central pivot and the right forward pivot; and, a release shaft pivotally secured to a medial end of the right release cross member and the left release cross member, and positioned such that when the release shaft is displaced in a forward direction, the release cross members apply force to the scissor linkages in a medial direction, causing the scissor linkages to close, thereby causing the distance between the first side frame assembly and the second side frame assembly to decrease, and when the release shaft is displaced in a rearward direction, the release cross members apply force to the scissor linkages in a lateral direction, causing the scissor linkages to open, thereby causing the distance between the first side frame assembly and the second side frame assembly to increase.

An embodiment of the present invention may also comprise: a method of manufacture of an apparatus that adjusts the width of a wheelchair comprising the steps: rigidly fixing the position and orientation of a right rear wheel and a right front wheel of the wheelchair with a first side frame assembly; rigidly fixing the position and orientation of a left rear wheel and a left front wheel of the wheelchair with a second side frame assembly; securing a right scissor linkage pivot to a rearward portion of the first side frame assembly and left scissor linkage pivot to a rearward portion of the second side frame assembly; pivotally securing a right pivot linkage to a forward portion of the first side frame assembly with a first lateral pivot and pivotally securing a left pivot linkage to a forward portion of the second side frame assembly with a second lateral pivot; pivotally securing a first scissor linkage between the right scissor linkage pivot on one end, and the left pivot linkage with a first forward pivot on an opposing end of the first scissor linkage, maintaining all pivot axis in an approximately parallel manner, thereby facilitating coplanar rotation of the first scissor linkage and the left pivot linkage; pivotally securing a second scissor linkage between the left scissor linkage pivot on one end, and the right pivot linkage with a second forward pivot on an opposing end of the second scissor linkage, maintaining all pivot axis in an approximately parallel manner, thereby facilitating coplanar rotation of the second scissor linkage and the right pivot linkage; pivotally securing the first scissor linkage to second scissor linkage with a central pivot located approximately midway between, and parallel to, the pivot axis of the scissor linkage pivots and the forward pivots; pivotally securing a lateral end of a left release cross member to the first scissor linkage between, and parallel to, the pivot axis of the central pivot and the left forward pivot; pivotally securing a lateral end of a right release cross member to the second scissor linkage between, and parallel to, the pivot axis of the central pivot and the right forward pivot; and, pivotally securing a release shaft to a medial end of the right release cross member and the left release cross member, such that a displacement to the release shaft in a forward direction causes the release cross members apply force to the scissor linkages in a medial direction, effecting the scissor linkages to close, thereby causing the distance between the first side frame assembly and the second side frame assembly to decrease, and that a displacement to the release shaft in a rearward direction causes the release cross members apply force to the scissor linkages in a lateral direction, effecting the scissor linkages to open, thereby causing the distance between the first side frame assembly and the second side frame assembly to increase.

An embodiment of the present invention may therefore comprise: a article of manufacture for an apparatus that adjusts the width of a wheelchair comprising the steps: a means for rigidly fixing the position and orientation of a right rear wheel and a right front wheel of the wheelchair with a first side frame assembly; a means for rigidly fixing the position and orientation of a left rear wheel and a left front wheel of the wheelchair with a second side frame assembly; a means for securing a right scissor linkage pivot to a rearward portion of the first side frame assembly and left scissor linkage pivot to a rearward portion of the second side frame assembly; a means for pivotally securing a right pivot linkage to a forward portion of the first side frame assembly with a first lateral pivot and pivotally securing a left pivot linkage to a forward portion of the second side frame assembly with a second lateral pivot; a means for pivotally securing a first scissor linkage between the right scissor linkage pivot on one end, and the left pivot linkage with a first forward pivot on an opposing end of the first scissor linkage, maintaining all pivot axis in an approximately parallel manner, thereby facilitating coplanar rotation of the first scissor linkage and the left pivot linkage; a means for pivotally securing a second scissor linkage between the left scissor linkage pivot on one end, and the right pivot linkage with a second forward pivot on an opposing end of the second scissor linkage, maintaining all pivot axis in an approximately parallel manner, thereby facilitating coplanar rotation of the second scissor linkage and the right pivot linkage; a means for pivotally securing the first scissor linkage to a second scissor linkage with a central pivot located approximately midway between, and parallel to, the pivot axis of the scissor linkage pivots and the forward pivots; a means for pivotally securing a lateral end of a left release cross member to the first scissor linkage between, and parallel to, the pivot axis of the central pivot and the left forward pivot; a means for pivotally securing a lateral end of a right release cross member to the second scissor linkage between, and parallel to, the pivot axis of the central pivot and the right forward pivot; and, a means for pivotally securing a release shaft to a medial end of the right release cross member and the left release cross member, such that a displacement to the release shaft in a forward direction causes the release cross members apply force to the scissor linkages in a medial direction, effecting the scissor linkages to close, thereby causing the distance between the first side frame assembly and the second side frame assembly to decrease, and that a displacement to the release shaft in a rearward direction causes the release cross members apply force to the scissor linkages in a lateral direction, effecting the scissor linkages to open, thereby causing the distance between the first side frame assembly and the second side frame assembly to increase.

DETAILED DESCRIPTION OF THE INVENTION

Figure 1:
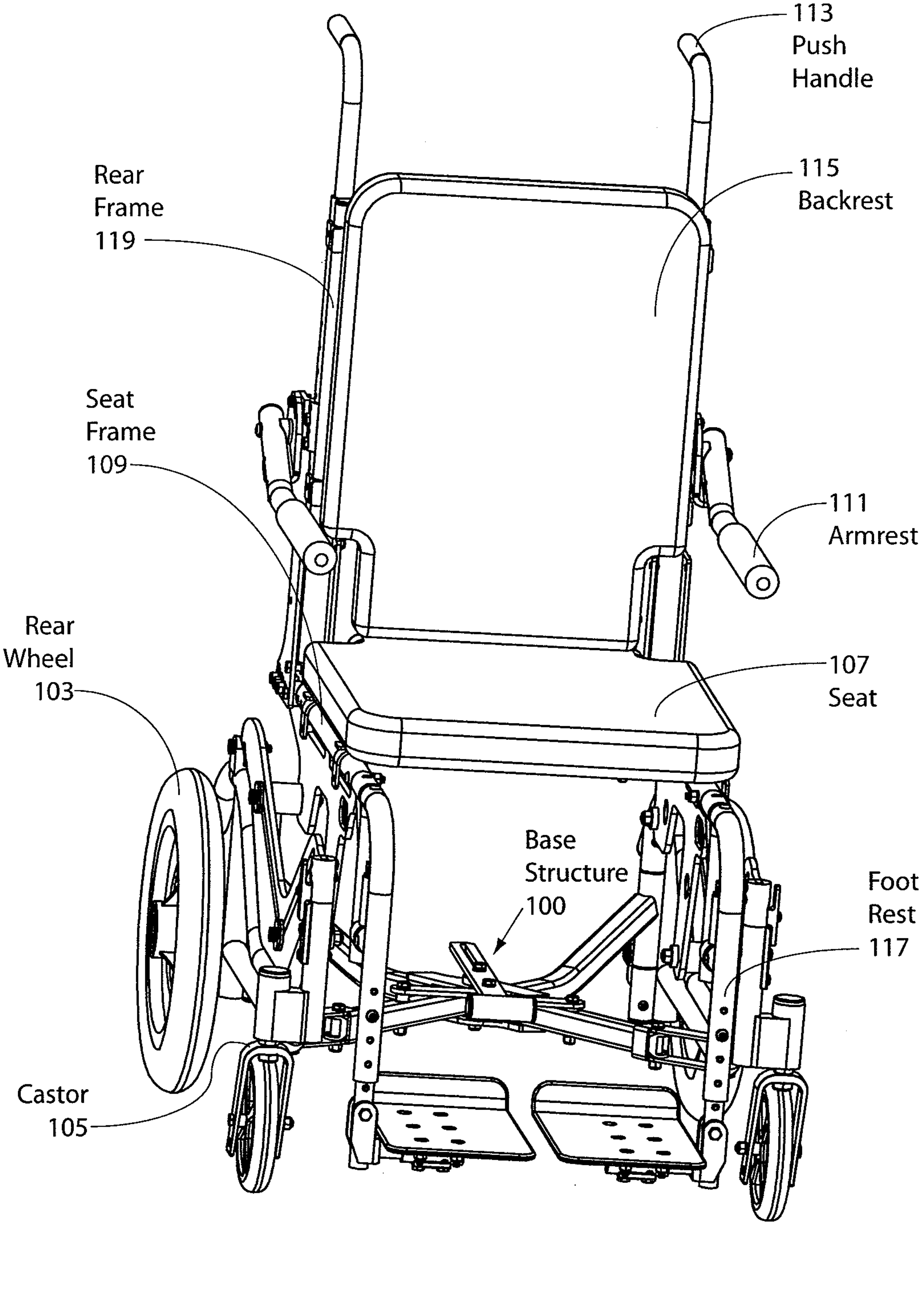
FIG. 1 illustrates an embodiment of an adjustable width wheelchair with a horizontal folding mechanism.

While this invention is susceptible to embodiment in many different forms, it is shown in the drawings, and will be described herein in detail, specific embodiments thereof with the understanding that the present disclosure is to be considered as an exemplification of the principles of the invention and is not to be limited to the specific embodiments described.

The disclosed embodiments utilizes a plurality of vertical pivots and linkages to facilitate the manipulation of a pair of horizontally oriented "scissor" linkages, in order to reduce the track of the wheels for use in close quarter environments such as commercial airlines, or to collapse the chair for transport or storage. FIG. 1 illustrates an embodiment of an adjustable width wheelchair with a horizontal folding mechanism. As shown in FIG. 1, a single passenger device with a seat 107 is supported by an upper frame structure 101. The vehicle is mobilized by a set of larger opposing rear drive wheels 103 and a pair of front steering wheels, or casters 105. A variable width base structure 100 forms the foundation for the chair, and supports the front casters 105 and rear wheels 103 to fixate the wheelbase of the vehicle.

The base structure 100 additionally supports the upper frame, which includes the seat frame 109, which supports the seat 107, a backrest 115, as well as optional or removable footrests 117, armrests 111 and push handles 113. Although FIG. 1 depicts the embodiment as a conventional style chair, it is well understood by those skilled in the art that a variety of design options are contemplated for the upper features and passenger interface components of the vehicle, and remain within the scope of the invention.

Figure 2:
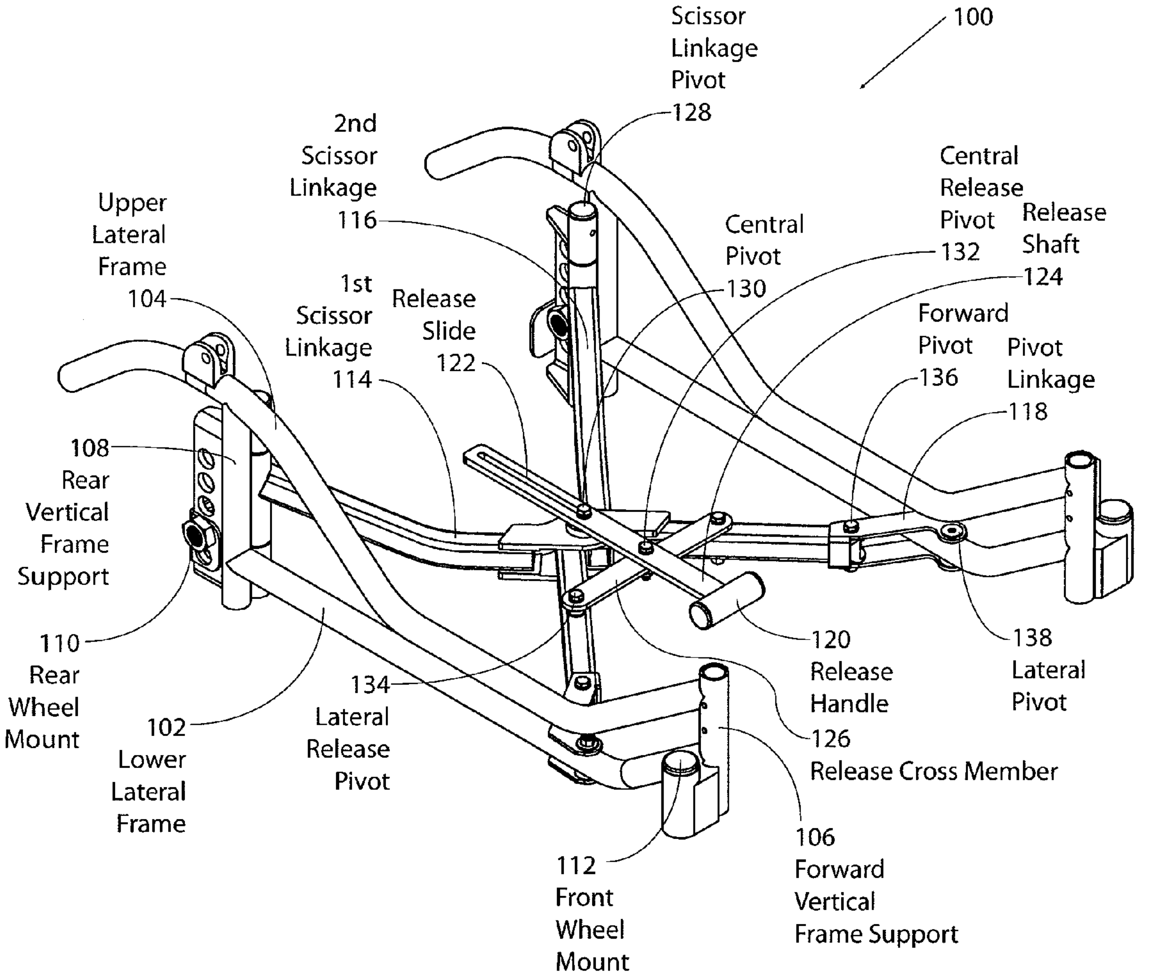
FIG. 2 is an isometric view of an embodiment of the folding wheelchair mechanism as depicted in the adjustable width wheelchair of FIG. 1.

FIG. 2 is an isometric view of an embodiment of a variable width base structure 100 as depicted in the adjustable width wheelchair of FIG. 1. As shown in FIG. 2, a base structure 100 is symmetrical (left to right) with the exception of the scissor linkage 114 and 116, which will be described in detail below. A lower lateral frame 102 structure is rigidly connected to an upper lateral frame 104 structure (depicted in this embodiment, but not limited by example to tubular structures) on a forward portion by a forward vertical frame support 106 and at the rear by a rear vertical frame support 108. The four structures form a loosely rectangular left and right side frame assembly 121 (depicted in FIG. 2) that provides a strong, rigid support for the rest of the base structure 100. These left and right side frame assemblies 121 attach at the rearward portion of the rear wheel mount 110, depicted here as an adjustable height mount with 5 optional rear wheel 103 axis positions exemplified to provide versatility to the vehicle, and a front wheel mount 112 on the forward portion to receive a rotating castor 105.

Each of the side frame assemblies 121 has a scissor linkage pivot 128 connected to the rearward portion, and is shown in this example as mounted parallel and medial to the rear vertical frame support 108. A pivot linkage 118 is pivotally attached with a lateral pivot 138 to a forward portion of the side frame assembly 121, and is shown in this example as mounted through the lower lateral frame 102 proximal to the forward vertical frame support 106. These mounts pivots 128 and 138 provide anchor and horizontal rotation points for the scissor linkage described next.

A scissor linkage that facilitates a reduction in the lateral distance between its opposing ends is comprised of a first scissor linkage 114 pivotally connected with a central pivot 130, approximately midlength to a second scissor linkage 116, to form an "X" shaped structure. As shown in FIG. 2, the first scissor linkage 114 is squarely tubular on either end, with a center span that has upper and lower brace portions to accommodate a free interface and scissor like motion with the second scissor linkage 116. The second scissor linkage 116 moves within the confines of the center span of the first scissor linkage 114 and is shown as joined opposing spans of square tube. When attached to the scissor linkage pivot 128, as demonstrated in FIG. 2, these linkages hold the distance between the center pivot 130 and the scissor linkage pivot 128 constant.

Thus, any relative motion of the first scissor linkage 114 to the second scissor linkage 116 facilitated by the center pivot 130 acting as a fulcrum, is translated into decreasing the distance between the opposing rear wheel mounts 110 affixed to the rear vertical frame supports 108 and the scissor linkage pivots 128 thereby decreasing the wheel track of the vehicle. Additionally, FIG. 2 shows that the forward and rearward portions of both the first scissor linkage 114 and the second scissor linkage 116 are offset, but their respective widths facilitate complete closure of the scissor mechanism.

In order for the left and right side frame assemblies 121 to remain parallel, and thus, for the front castors 105 and rear wheels 103 to remain in the same track, the forward portions of the first and second scissor linkages 114, 116 are connected to the side frame assemblies 121 with a double pivoting pivot linkage 118. The proximal portion of the pivot linkage 118 connects to the forward distal portion of the scissor linkages 114, 116 with a forward pivot 136, and the distal portion of the pivot linkage 118 connects to the side frame assembly 121 at the lateral pivot 138. This pivot linkage 118 is free to rotate in a horizontal arc to accommodate the forward movement of the scissor linkages 114, 116 as the distance between the opposing rear wheel mounts 110 is decreased. This mechanism, shown as a "U" shaped bracket bolted through the lower lateral frames 102, facilitates front and rear wheel tracking when the width of the vehicle is varied while providing strength and stability to the scissor mechanism.

Actuation of the scissor mechanism is facilitated by a release mechanism that utilizes a release handle 120 connected by a release shaft 124 to a central release pivot 132. The central release pivot 132 joins the release shaft 124 to a pair of release cross members 126 that pivotally attach to each of the scissor linkages 114, 116 with a lateral release pivot 134 approximately midway between the central pivot 130 and the forward pivot 136. The opposing end of the release shaft 124, from the release handle, is slideably retained by the central pivot 130 through the release slide 122. This facilitates motion of the release shaft 124 in a forward and rearward manner, while restricting motion of the shaft in a lateral manner thereby translating forward motion of the release shaft 124 into lateral restriction of the first scissor linkage 114 with respect the second scissor linkage 116. Thus, when the release handle 120 is pulled in a direction toward the front of the wheelchair, the track or width of the chair decreases, and when the release handle 120 is pushed toward the rear of the wheelchair, the track or width of the chair increases.

This manipulation of the wheelchair width may extend from a fully wide track where the wheel track is at its maximum, or it can be reduced to a minimized track for storage or transport where the wheel track is at its minimum and the rear wheel mounts 110 are nearly touching. Additionally, the central pivot 130 (shown in this example as a bolt and nut), may be secured at any range within the release slide 122 to affix the position of the release shaft 124 and lock the wheel track into position for use in close quarter environments such as commercial airlines, tight spaces, small doorways or the like.

Figure 3:
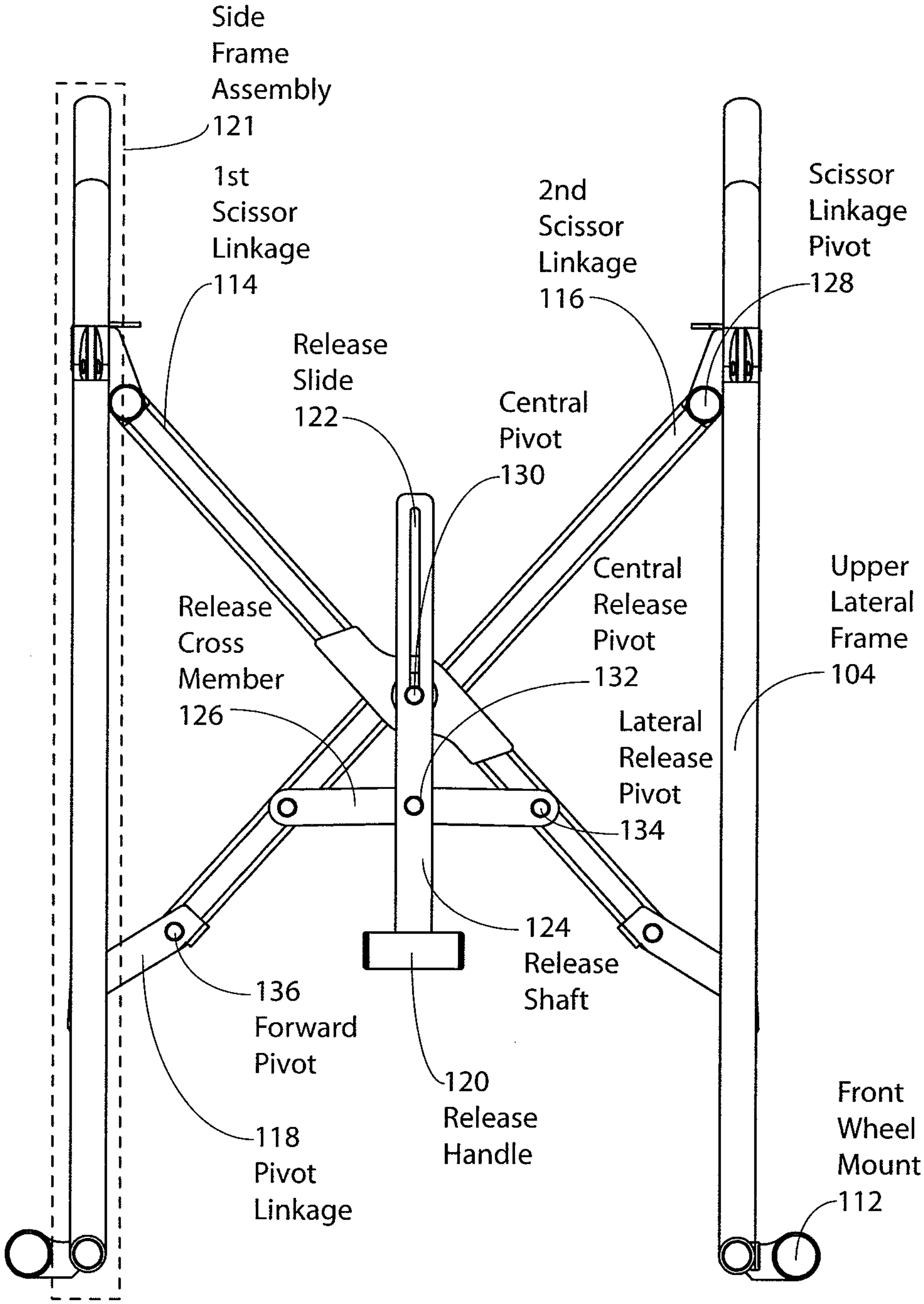
FIG. 3 shows a top view of an embodiment of the folding wheelchair mechanism depicted in FIG. 2.

FIG. 3 shows a top view of an embodiment of the folding wheelchair mechanism depicted in FIG. 2. As was similarly depicted in FIG. 2, a base structure 100 utilizing a pair of side frame assemblies 121 attach at the rearward portion a rear wheel mount 110, each of which has a scissor linkage pivot 128 connected to the rearward portion, which is mounted to the rear vertical frame support 108. A pivot linkage 118 is pivotally attached with a lateral pivot 138 to a forward portion of the side frame assembly 121, and mounted through the lower lateral frame 102 proximal to the forward vertical frame support 106 providing anchor and horizontal rotation points for the scissor linkage. The first scissor linkage 114 is pivotally connected with a central pivot 130 to a second scissor linkage 116. FIG. 3 additionally shows that the forward and rearward portions of both the first scissor linkage 114 and the second scissor linkage 116 are offset, but their respective widths facilitate complete closure of the scissor mechanism.

As was similarly shown in FIG. 2, first and second scissor linkages 114, 116 are connected to the side frame assemblies 121 with a double pivoting pivot linkage 118. The proximal portion of the pivot linkage 118 connects to the forward distal portion of the scissor linkages 114, 116 with the forward pivot 136 and the distal portion of the pivot linkage 118 connecting to the side frame assembly 121 at the lateral pivot 138. This pivot linkage 118 is free to rotate in a horizontal arc to accommodate the forward movement of the scissor linkages 114, 116 as the distance between the opposing rear wheel mounts 110 is decreased. This mechanism, is bolted through the lower lateral frames 102.

The release mechanism utilizes a release handle 120 connected by a release shaft 124 to a central release pivot 132. The central release pivot 132 joins the release shaft 124 to a pair of release cross members 126 that pivotally attach to each of the scissor linkages 114, 116 with a lateral release pivot 134 approximately midway between the central pivot 130 and the forward pivot 136. The opposing end of the release shaft 124 from the release handle is slideably fixed to the central pivot 130 through the release slide 122. FIG. 3 shows when the release handle 120 is pulled in a direction toward the front of the wheelchair, the track or width of the chair decreases, and when the release handle 120 is pushed toward the rear of the wheelchair, the track or width of the chair increases.

Figure 4:
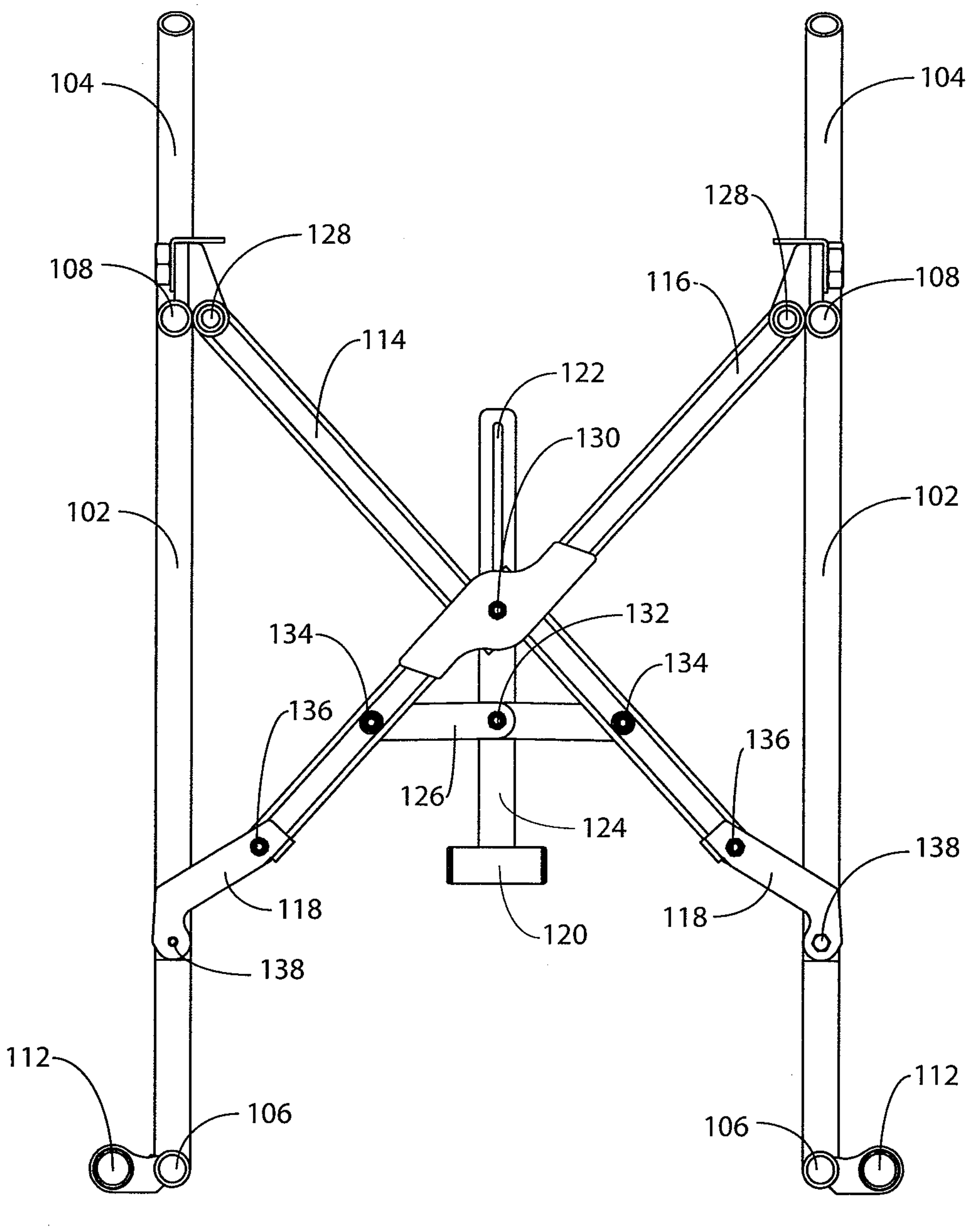
FIG. 4 shows a bottom view of an embodiment of the folding wheelchair mechanism depicted in FIG. 2.

FIG. 4 shows a bottom view of an embodiment of the folding wheelchair mechanism depicted in FIG. 2. As was similarly depicted in FIG. 3, the release mechanism utilizes a release handle 120 connected by a release shaft 124 to a central release pivot 132. The central release pivot 132 joins the release shaft 124 to a pair of release cross members 126 that pivotally attach to each of the scissor linkages 114, 116 with a lateral release pivot 134 approximately midway between the central pivot 130 and the forward pivot 136. The opposing end of the release shaft 124 from the release handle is slideably fixed to the central pivot 130 through the release slide 122. FIG. 3 shows how when the release handle 120 is pulled in a direction toward the front of the wheelchair, the track or width of the chair decreases, and when the release handle 120 is pushed toward the rear of the wheelchair, the track or width of the chair increases.

Figure 5:
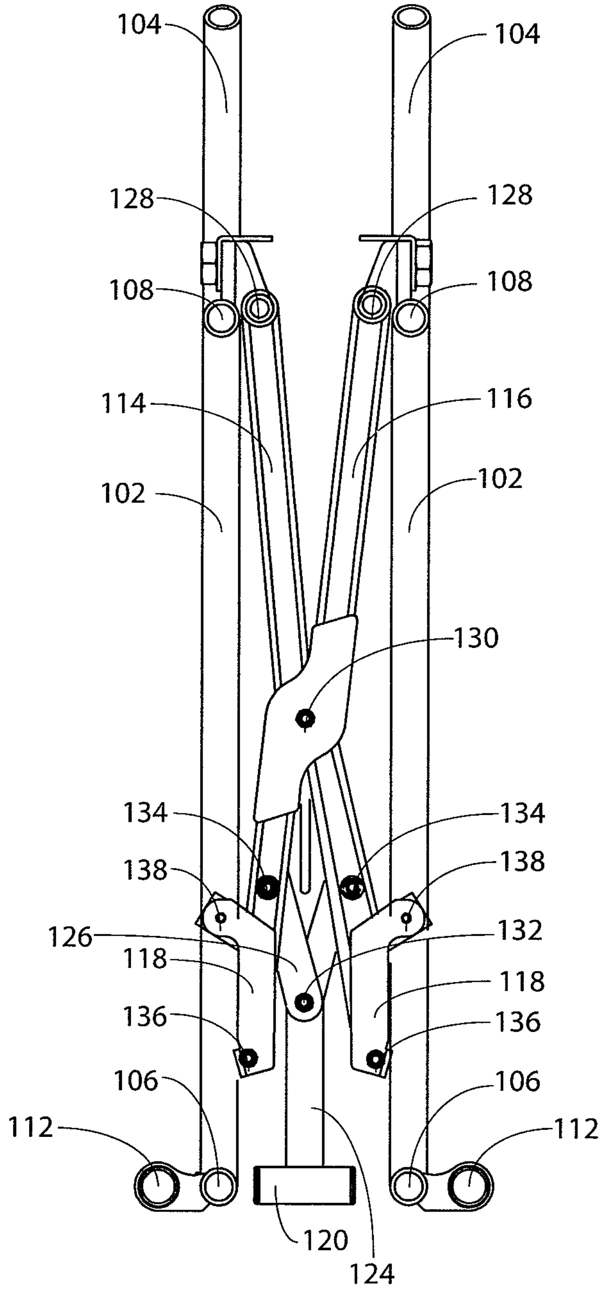
FIG. 5 shows a top view of an embodiment of the folding wheelchair mechanism depicted in FIG. 3 in a folded position.

FIG. 5 shows a top view of an embodiment of the folding wheelchair mechanism depicted in FIG. 4 in a folded position. As depicted in FIG. 5, the release mechanism is placed in a forward position, thereby reducing the width of the base structure 100. The release handle 120, connected by a release shaft 124 to the central release pivot 132, has been moved forward. The central release pivot 132 joins the release shaft 124 to the pair of release cross members 126 that are pivotally attached to each of the scissor linkages 114, 116 with a lateral release pivot 134. The example of FIG. 5 shows how the forward force of the release shaft 124 is transmitted through central release pivot 132, to the release cross members 126, to the lateral release pivot 134, and finally to the scissor linkages 114, 116 drawing them towards one another.

When the scissor linkages 114, 116 are drawn together, the lateral force is transmitted by the rearward ends to the scissor linkage pivots 128 and by the forward ends to the forward pivot 136. The forward pivot 136 transmits force through the pivot linkage 118 and to the side frame assembly 121 via lateral pivot 138. As this force is transmitted through the pivot linkage 118, the linkage rotates thereby decreasing the total length of the scissor linkage 114 or 116 and the pivot linkage 118 by an amount that facilitates a reduction in lateral track while maintaining the parallel orientation of the side frame assemblies 121. This maintains the relative orientation and track of the left rear wheel 103 to the left front castor 105, while concurrently maintaining the relative orientation and track of the right rear wheel 103 to the right front castor 105. Thus, when the release handle 120 is pulled toward the front of the base structure 100, a precise decrease in track or width of the chair is realized.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The embodiments of the invention in which an exclusive property or privilege is claimed are defined as follows:

1. An apparatus that supports and adjusts the width of a wheelchair comprising:

a first side frame assembly that rigidly affixes the position and orientation of a right rear wheel and a right front wheel of said wheelchair;

a second side frame assembly that rigidly affixes the position and orientation of a left rear wheel and a left front wheel of said wheelchair;

a right scissor linkage pivot secured to a rearward portion of said first side frame assembly and left scissor linkage pivot secured to a rearward portion of said second side frame assembly;

a first scissor linkage pivotally secured between said right scissor linkage pivot on one end, and pivotally secured with a forward pivot to a left pivot linkage on an opposing end of said first scissor linkage, wherein said axis of said right scissor linkage pivot and said axis of said left forward pivot are approximately parallel, thereby facilitating coplanar rotation of said first scissor linkage and said left pivot linkage, said right scissor linkage pivot that is affixed to a rearward portion of said first side frame assembly and said left forward pivot that is pivotally secured to a forward portion of said first side frame assembly;

a second scissor linkage pivotally secured between said left scissor linkage pivot on one end, and pivotally secured with a forward pivot to a right pivot linkage on an opposing end of said second scissor linkage, wherein said axis of said left scissor linkage pivot and said axis of said right forward pivot are approximately parallel, thereby facilitating coplanar rotation of said second scissor linkage and said right pivot linkage, said left scissor linkage pivot that is affixed to a rearward portion of said second side frame assembly and said right forward pivot that is pivotally secured to a forward portion of said second side frame assembly;

a central pivot that pivotally secures said first scissor linkage to said second scissor linkage approximately midway between, and parallel to, said pivot axis of said scissor linkage pivots and said forward pivots of each said scissor linkage;

a left release cross member pivotally secured at a lateral end to said first scissor linkage between, and parallel to, said pivot axis of said central pivot and said left forward pivot;

a right release cross member pivotally secured at a lateral end to said second scissor linkage between, and parallel to, said pivot axis of said central pivot and said right forward pivot; and, a release shaft pivotally secured to a medial end of said right release cross member and said left release cross member, and positioned such that when said release shaft is displaced in a forward direction, said release cross members apply force to said scissor linkages in a medial direction, causing said scissor linkages to close, thereby causing the distance between said first side frame assembly and said second side frame assembly to decrease, and when said release shaft is displaced in a rearward direction, said release cross members apply force to said scissor linkages in a lateral direction, causing said scissor linkages to open, thereby causing the distance between said first side frame assembly and said second side frame assembly to increase.

2. The apparatus of claim 1 wherein said first side frame assembly and said second side frame assembly each further comprise:

an upper lateral frame;

a lower lateral frame;

a forward vertical frame support;

a rear vertical frame support;

a rear wheel mount; and, a front wheel mount.

3. The apparatus of claim 1 wherein said release shaft further comprises:

a release handle disposed on a forward end of said release shaft; and, a release slide comprising a channel that a extends over a length of a rearward end of said release shaft, said release slide that facilitates slidable retention of said central pivot, and along with said central release pivot, sets the orientation and limits of movement of said release shaft.

4. The apparatus of claim 3 wherein said release slide is disposed from the approximate center of said release shaft to nearly a rearward end of said release shaft.

5. The apparatus of claim 3 wherein said central pivot may be secured to said release shaft at one or more positions within said release slide, thereby locking the width of said wheelchair in one or more positions.

6. The apparatus of claim 1 wherein the orientation of said first side frame assembly remains substantially parallel to said second side frame assembly when said release shaft is displaced and said width of said wheelchair is varied.

7. The apparatus of claim 1 wherein the position of said left front wheel remains constant to said left rear wheel, and the position of said right front wheel remains constant to said right rear wheel when said release shaft is displaced and said width of said wheelchair is varied.

8. The apparatus of claim 1 wherein a wheel base distance of said wheelchair remains constant when said release shaft is displaced and said width of said wheelchair is varied.

9. An adjustable width wheelchair comprising:

a base structure comprising:

a first side frame assembly that rigidly affixes the position and orientation of a right rear wheel and a right front wheel of said wheelchair;

a second side frame assembly that rigidly affixes the position and orientation of a left rear wheel and a left front wheel of said wheelchair;

a right scissor linkage pivot secured to a rearward portion of said first side frame assembly and left scissor linkage pivot secured to a rearward portion of said second side frame assembly;

a first scissor linkage pivotally secured between said right scissor linkage pivot on one end, and pivotally secured with a forward pivot to a left pivot linkage on an opposing end of said first scissor linkage, wherein said axis of said right scissor linkage pivot and said axis of said left forward pivot are approximately parallel, thereby facilitating coplanar rotation of said first scissor linkage and said left pivot linkage, said right scissor linkage pivot that is affixed to a rearward portion of said first side frame assembly and said left forward pivot that is pivotally secured to a forward portion of said first side frame assembly;

a second scissor linkage pivotally secured between said left scissor linkage pivot on one end, and pivotally secured with a forward pivot to a right pivot linkage on an opposing end of said second scissor linkage, wherein said axis of said left scissor linkage pivot and said axis of said right forward pivot are approximately parallel, thereby facilitating coplanar rotation of said second scissor linkage and said right pivot linkage, said left scissor linkage pivot that is affixed to a rearward portion of said second side frame assembly and said right forward pivot that is pivotally secured to a forward portion of said second side frame assembly;

a central pivot that pivotally secures said first scissor linkage to said second scissor linkage approximately midway between, and parallel to, said pivot axis of said scissor linkage pivots and said forward pivots of each said scissor linkage;

a left release cross member pivotally secured at a lateral end to said first scissor linkage between, and parallel to, said pivot axis of said central pivot and said left forward pivot;

a right release cross member pivotally secured at a lateral end to said second scissor linkage between, and parallel to, said pivot axis of said central pivot and said right forward pivot; and, a release shaft pivotally secured to a medial end of said right release cross member and said left release cross member, and positioned such that when said release shaft is displaced in a forward direction, said release cross members apply force to said scissor linkages in a medial direction, causing said scissor linkages to close, thereby causing the distance between said first side frame assembly and said second side frame assembly to decrease, and when said release shaft is displaced in a rearward direction, said release cross members apply force to said scissor linkages in a lateral direction, causing said scissor linkages to open, thereby causing the distance between said first side frame assembly and said second side frame assembly to increase;

a seat frame laterally supported by said base structure;

a seat laterally supported by said seat frame;

a rear frame supported by said seat frame; and, a backrest laterally supported by said rear frame.

10. A method of manufacture of an apparatus that adjusts the width of a wheelchair comprising the steps:

rigidly fixing the position and orientation of a right rear wheel and a right front wheel of said wheelchair with a first side frame assembly;

rigidly fixing the position and orientation of a left rear wheel and a left front wheel of said wheelchair with a second side frame assembly;

securing a right scissor linkage pivot to a rearward portion of said first side frame assembly and left scissor linkage pivot to a rearward portion of said second side frame assembly;

pivotally securing a right pivot linkage to a forward portion of said first side frame assembly with a first lateral pivot and pivotally securing a left pivot linkage to a forward portion of said second side frame assembly with a second lateral pivot;

pivotally securing a first scissor linkage between said right scissor linkage pivot on one end, and said left pivot linkage with a first forward pivot on an opposing end of said first scissor linkage, maintaining all pivot axis in an approximately parallel manner, thereby facilitating coplanar rotation of said first scissor linkage and said left pivot linkage;

pivotally securing a second scissor linkage between said left scissor linkage pivot on one end, and said right pivot linkage with a second forward pivot on an opposing end of said second scissor linkage, maintaining all pivot axis in an approximately parallel manner, thereby facilitating coplanar rotation of said second scissor linkage and said right pivot linkage;

pivotally securing said first scissor linkage to second scissor linkage with a central pivot located approximately midway and between and parallel to said pivot axis of said scissor linkage pivots and said forward pivots;

pivotally securing a lateral end of a left release cross member to said first scissor linkage between, and parallel to, said pivot axis of said central pivot and said left forward pivot;

pivotally securing a lateral end of a right release cross member to said second scissor linkage between, and parallel to, said pivot axis of said central pivot and said right forward pivot; and, pivotally securing a release shaft to a medial end of said right release cross member and said left release cross member, such that a displacement to said release shaft in a forward direction causes said release cross members apply force to said scissor linkages in a medial direction, effecting said scissor linkages to close, thereby causing the distance between said first side frame assembly and said second side frame assembly to decrease, and that a displacement to said release shaft in a rearward direction causes said release cross members to apply force to said scissor linkages in a lateral direction, effecting said scissor linkages to open, thereby causing the distance between said first side frame assembly and said second side frame assembly to increase.

11. A method of manufacture of the apparatus of claim 10 further comprising the steps:

rigidly fixing the position and orientation of a top portion of a forward vertical frame support to an upper lateral frame near a forward end and to a top portion of rearward vertical frame near a rearward end of said upper lateral frame;

rigidly fixing the position and orientation of a bottom portion of said forward vertical frame support to a lower lateral frame near a forward end and to a bottom portion of said rearward vertical frame near a rearward end of said lower lateral frame;

rigidly fixing the position and orientation of a rear wheel mount to said rearward vertical frame and a front wheel mount to said forward vertical frame to create said side frame assembly.

12. A method of manufacture of the apparatus of claim 10 further comprising the steps:

rigidly fixing the position and orientation of a release handle on a forward end of said release shaft; and, creating a release slide comprising a channel that extends over a length of a rearward end of said release shaft to facilitate slidable retention of said central pivot, thereby orienting and limiting the movement of said release shaft.

13. A method of manufacture of the apparatus of claim 10 further comprising the steps:

creating a release slide comprising a channel that extends from the approximate center of said release shaft to nearly a rearward end of said release shaft.

14. A method of manufacture of the apparatus of claim 10 further comprising the steps:

securing said central pivot to said release shaft at one or more positions within said release slide, thereby locking the width of said wheelchair in one or more positions.

15. An article of manufacture for an apparatus that adjusts the width of a wheelchair comprising the steps:

a means for rigidly fixing the position and orientation of a right rear wheel and a right front wheel of said wheelchair with a first side frame assembly;

a means for rigidly fixing the position and orientation of a left rear wheel and a left front wheel of said wheelchair with a second side frame assembly;

a means for securing a right scissor linkage pivot to a rearward portion of said first side frame assembly and left scissor linkage pivot to a rearward portion of said second side frame assembly;

a means for pivotally securing a right pivot linkage to a forward portion of said first side frame assembly with a first lateral pivot and pivotally securing a left pivot linkage to a forward portion of said second side frame assembly with a second lateral pivot;

a means for pivotally securing a first scissor linkage between said right scissor linkage pivot on one end, and said left pivot linkage with a first forward pivot on an opposing end of said first scissor linkage, maintaining all pivot axis in an approximately parallel manner, thereby facilitating coplanar rotation of said first scissor linkage and said left pivot linkage;

a means for pivotally securing a second scissor linkage between said left scissor linkage pivot on one end, and said right pivot linkage with a second forward pivot on an opposing end of said second scissor linkage, maintaining all pivot axis in an approximately parallel manner, thereby facilitating coplanar rotation of said second scissor linkage and said right pivot linkage;

a means for pivotally securing said first scissor linkage to a second scissor linkage with a central pivot located approximately midway between, and parallel to, said pivot axis of said scissor linkage pivots and said forward pivots;

a means for pivotally securing a lateral end of a left release cross member to said first scissor linkage between, and parallel to, said pivot axis of said central pivot and said left forward pivot;

a means for pivotally securing a lateral end of a right release cross member to said second scissor linkage between, and parallel to, said pivot axis of said central pivot and said right forward pivot; and, a means for pivotally securing a release shaft to a medial end of said right release cross member and said left release cross member, such that a displacement to said release shaft in a forward direction causes said release cross members apply force to said scissor linkages in a medial direction, effecting said scissor linkages to close, thereby causing the distance between said first side frame assembly and said second side frame assembly to decrease, and that a displacement to said release shaft in a rearward direction causes said release cross members apply force to said scissor linkages in a lateral direction, effecting said scissor linkages to open, thereby causing the distance between said first side frame assembly and said second side frame assembly to increase.

* * * * *